United States Patent
Faber

(10) Patent No.: US 11,230,967 B2
(45) Date of Patent: Jan. 25, 2022

(54) INTERNAL COMBUSTION ENGINE

(71) Applicant: Dr. Ing. h.c. F. Porsche Aktiengesellschaft, Stuttgart (DE)

(72) Inventor: Henrik Faber, Calw (DE)

(73) Assignee: Dr. Ing. h.c. F. Porsche Aktiengesellschaft

(*) Notice: Subject to any disclaimer, the term of this patent is extended or adjusted under 35 U.S.C. 154(b) by 0 days.

(21) Appl. No.: 17/178,405

(22) Filed: Feb. 18, 2021

(65) Prior Publication Data

US 2021/0301716 A1 Sep. 30, 2021

(30) Foreign Application Priority Data

Mar. 25, 2020 (DE) .................... 10 2020 108 134.0

(51) Int. Cl.
*F02M 37/24* (2019.01)
*F02B 47/02* (2006.01)

(52) U.S. Cl.
CPC ............. *F02B 47/02* (2013.01); *F02M 37/24* (2019.01)

(58) Field of Classification Search
CPC ........ Y02T 10/12; F02M 26/35; F02M 37/24; F01M 13/00; F01M 2013/0477; Y02A 50/20; B01D 17/02; B01D 17/04; B01D 17/045; B01D 36/003; F02D 2250/08
See application file for complete search history.

(56) References Cited

U.S. PATENT DOCUMENTS

| | | | |
|---|---|---|---|
| 4,881,511 A * | 11/1989 | Pickering | F01N 3/08 123/572 |
| 5,937,837 A * | 8/1999 | Shaffer | F01M 13/04 123/573 |
| 7,913,676 B2 | 3/2011 | Breuninger et al. | |
| 2009/0313977 A1* | 12/2009 | Liu | F01M 13/04 60/297 |
| 2010/0077987 A1* | 4/2010 | Voisin | F02B 75/20 123/250 |
| 2018/0023392 A1* | 1/2018 | Shkolnik | F02B 55/02 418/142 |
| 2018/0274488 A1* | 9/2018 | Martin | F02M 25/0222 |

(Continued)

FOREIGN PATENT DOCUMENTS

| | | |
|---|---|---|
| DE | 3638986 A1 | 5/1988 |
| DE | 102005059668 A1 | 6/2007 |
| DE | 10310452 B4 | 8/2008 |

(Continued)

OTHER PUBLICATIONS

DE-102009059147-A1 English Translation (Year: 2011).*

*Primary Examiner* — George C Jin
*Assistant Examiner* — Teuta B Holbrook
(74) *Attorney, Agent, or Firm* — RatnerPrestia

(57) ABSTRACT

An internal combustion engine includes a crankcase and a cylinder head. The cylinder head and the crankcase delimit at least one cylinder in which a translationally moving piston is arranged. A water injection device injects water into the at least one cylinder. A crankcase ventilation device is fluidically connected to the crankcase. A blow-by mixture containing injection water can flow through the crankcase ventilation device. The crankcase ventilation device has an activated charcoal filter. The blow-by mixture containing the injection water can flow through the activated charcoal filter.

9 Claims, 2 Drawing Sheets

(56) References Cited

U.S. PATENT DOCUMENTS

Figure 1:
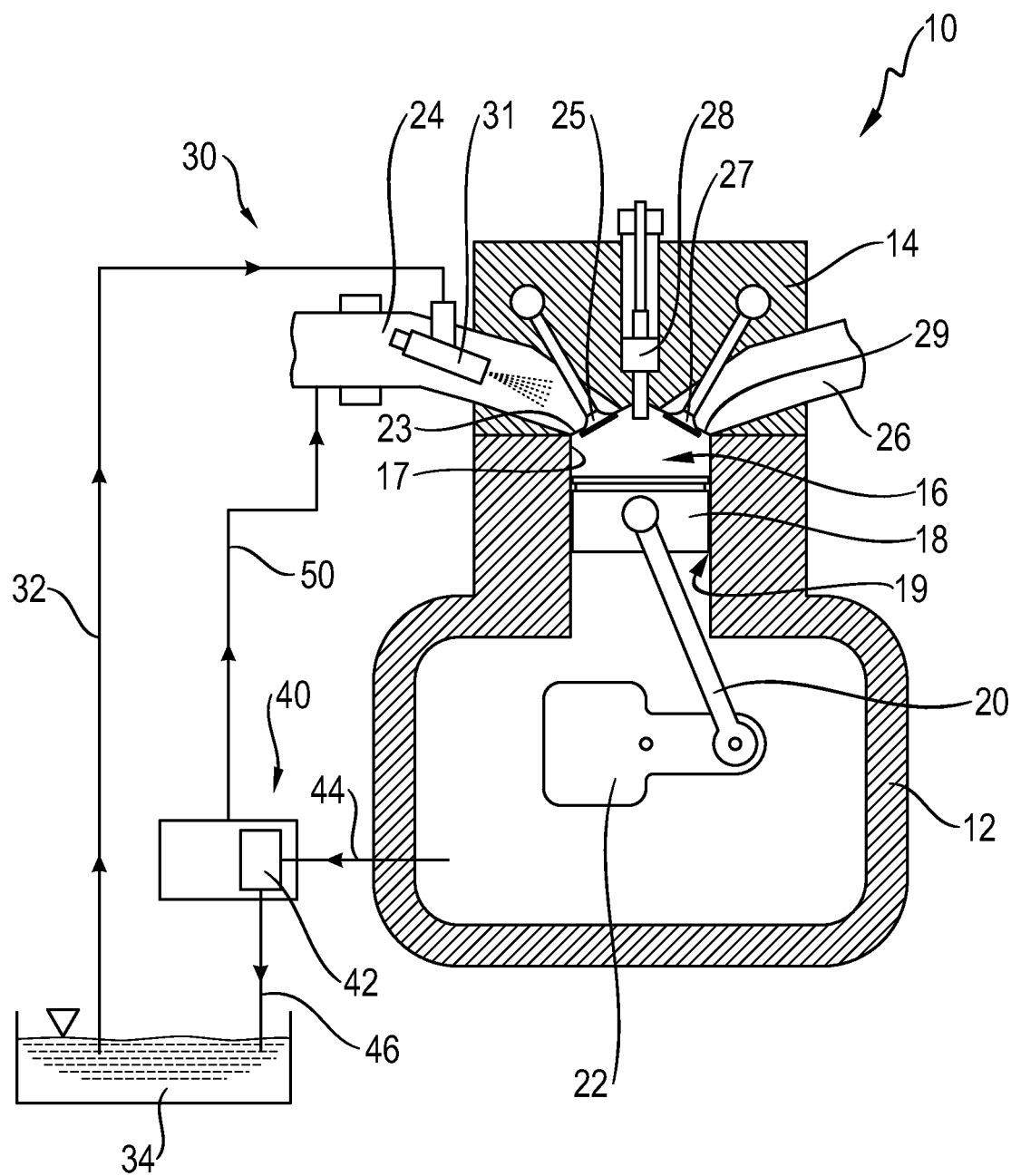

2020/0032745 A1    1/2020    Bruhn et al.

FOREIGN PATENT DOCUMENTS

| | | | |
|---|---|---|---|
| DE | 102009059147 A1 * | 6/2011 | ............ F02M 37/24 |
| DE | 102015208508 A1 | 11/2016 | |
| DE | 102016205145 A1 | 10/2017 | |
| DE | 102017206251 B3 | 5/2018 | |
| DE | 102017108249 A1 | 10/2018 | |
| DE | 102018114342 B4 | 12/2019 | |

* cited by examiner

INTERNAL COMBUSTION ENGINE

CROSS REFERENCE TO RELATED APPLICATION

This application claims priority to German Patent Application No. 10 2020 108 134.0, filed Mar. 25, 2020, the content of such application being incorporated by reference herein in its entirety.

FIELD OF THE INVENTION

The invention concerns an internal combustion engine with a crankcase, a cylinder head, wherein the cylinder head and the crankcase delimit at least one cylinder in which a translationally moving piston is arranged, a water injection device for injecting water into the at least one cylinder, and a crankcase ventilation device which is fluidically connected to the crankcase, wherein a blow-by mixture containing injection water can flow through the crankcase ventilation device.

BACKGROUND OF THE INVENTION

Such internal combustion engines have been known for a long time. During operation of the internal combustion engines, a gas-oil mixture from a cylinder of the internal combustion engine passes through a movement gap, formed between the piston rings and a cylinder liner of the internal combustion engine, into the crankcase. These mixtures are generally known as blow-by gases or blow-by mixtures. To prevent the pressure in the crankcase from rising unacceptably, internal combustion engines usually have a crankcase ventilation device. Such an internal combustion engine is disclosed for example in DE 10 2017 108 249 A1, which is incorporated by reference herein for all purposes.

To save fuel, increase the power of the internal combustion engine and/or reduce the emissions from the internal combustion engine, internal combustion engines are equipped with a water injection device. Via the water injection device, water is injected into the intake tract of the internal combustion engine or directly into the cylinder. An example of such an internal combustion engine with a water injection device is presented in DE 10 2015 208 508 A1, which is incorporated by reference herein in its entirety and for all purposes. Here, the heat from the internal combustion engine intake air and/or from the internal combustion engine components is transferred to the water, whereby the water evaporates and thereby causes a cooling effect of the internal combustion engine intake air and/or internal combustion engine components.

The water introduced into the cylinder through the internal combustion engine intake air mixes with the remaining components in the combustion chamber and is thereby contained in the blow-by mixture in the form of water vapor, so that the water present as water vapor also flows into the crankcase. Starting from the crankcase, the water vapor flows out of the crankcase via the crankcase ventilation device into a collection tank or is discharged to atmosphere, wherein the water vapor in the crankcase ventilation device cools so that it liquefies and thereby separates from the gaseous components of the blow-by mixture.

It is a problem that water flowing into the collection tank or discharged into the atmosphere contains pollutants, in particular hydrocarbons, wherein both reuse of the polluted water for injection into the intake tract and environmentally friendly disposal of the water to atmosphere are not possible or only possible with limitations.

SUMMARY OF THE INVENTION

In view of the foregoing challenges, described herein is an internal combustion engine which, in a simple and economic fashion, allows the re-use of the water flowing out of the crankcase and the environmentally friendly disposal of the water.

Because the crankcase ventilation device has an activated charcoal filter, wherein the blow-by mixture containing the injection water can flow through the activated charcoal filter, the blow-by mixture, in particular the water contained in the blow-by mixture, is cleaned of its environmentally harmful hydrocarbons, whereby the water from the crankcase ventilation device can easily be discharged to atmosphere or is available to the water injection device for reuse. The hydrocarbons are filtered out of the water or blow-by mixture by the activated charcoal filter, since the hydrocarbons are deposited on the activated charcoal filter.

Because of the high temperature prevailing in the crankcase, the water in the crankcase is in vapor form. When the blow-by mixture containing the injection water flows through the crankcase ventilation device and hence through the activated charcoal filter, the blow-by mixture cools such that the water liquefies and thereby separates from the remaining gaseous constituents of the blow-by mixture. By flowing through the activated charcoal filter, the blow-by mixture and in particular the water downstream of the activated charcoal filter is freed from hydrocarbons, so that the water is harmless to the environment and can be discharged to the environment.

Preferably, the water injection device has a water tank and a water injector, wherein the crankcase ventilation device is fluidically connected to the water tank such that water which has separated out of the blow-by mixture and passed through the activated charcoal filter flows into the water tank. The water injector is fluidically connected via a water line to the water tank which is situated at a location on the motor vehicle remote from the water injector. The crankcase ventilation device is also fluidically connected to the water tank, wherein the water which has separated from the remaining constituents of the blow-by mixture and been cleaned by the activated charcoal filter flows into the water tank, is collected in the water tank and can be reused for water injection. Alternatively, the cleaned water is discharged to the environment.

In a preferred embodiment, the activated charcoal filter has an intermediate water store (i.e., a source such as a container) which is fluidically connected to a water injector of the water injection device. In this way, the cleaned water collected in the intermediate water storage can be injected immediately and directly into the intake air or directly into the cylinder. The intermediate water store may be provided in the housing of the activated charcoal filter, for example by a double-walled housing, wherein the intermediate water store is configured to be smaller than the water tank of the water injection device.

Preferably, the water injection device has a water injector which is arranged in an intake tract that can be fluidically connected to the cylinder, wherein the intake air carries the injected water into the cylinder. In this way, the water injection is simplified and the production costs of the water injector are reduced, since the thermal load on the water injector is lower and thereby cheaper materials may be used for producing the water injector.

In a preferred embodiment, the crankcase ventilation device is fluidically connected to the intake tract such that the gases of the blow-by mixture are conducted into the intake tract. The water vapor contained in the blow-by mixture condenses in the crankcase ventilation device, so that the water is separated from the remaining gases of the blow-by mixture. The gaseous constituents of the blow-by mixture are conducted into the intake tract, flow into the cylinder with the internal combustion engine intake air, and from the cylinder flow into the environment via an exhaust gas system with several exhaust gas cleaning components.

Thus an internal combustion engine is created with a water injection, wherein the water flowing with the blow-by mixture into the crankcase and into the crankcase ventilation device is cleaned of hydrocarbons in a simple and economic fashion, and can thereby be discharged to the atmosphere in an environmentally friendly manner or reused in the water injection system.

BRIEF DESCRIPTION OF THE DRAWING FIGURES

An exemplary embodiment of the invention is explained in more detail with reference to the drawings.

Figure 2:
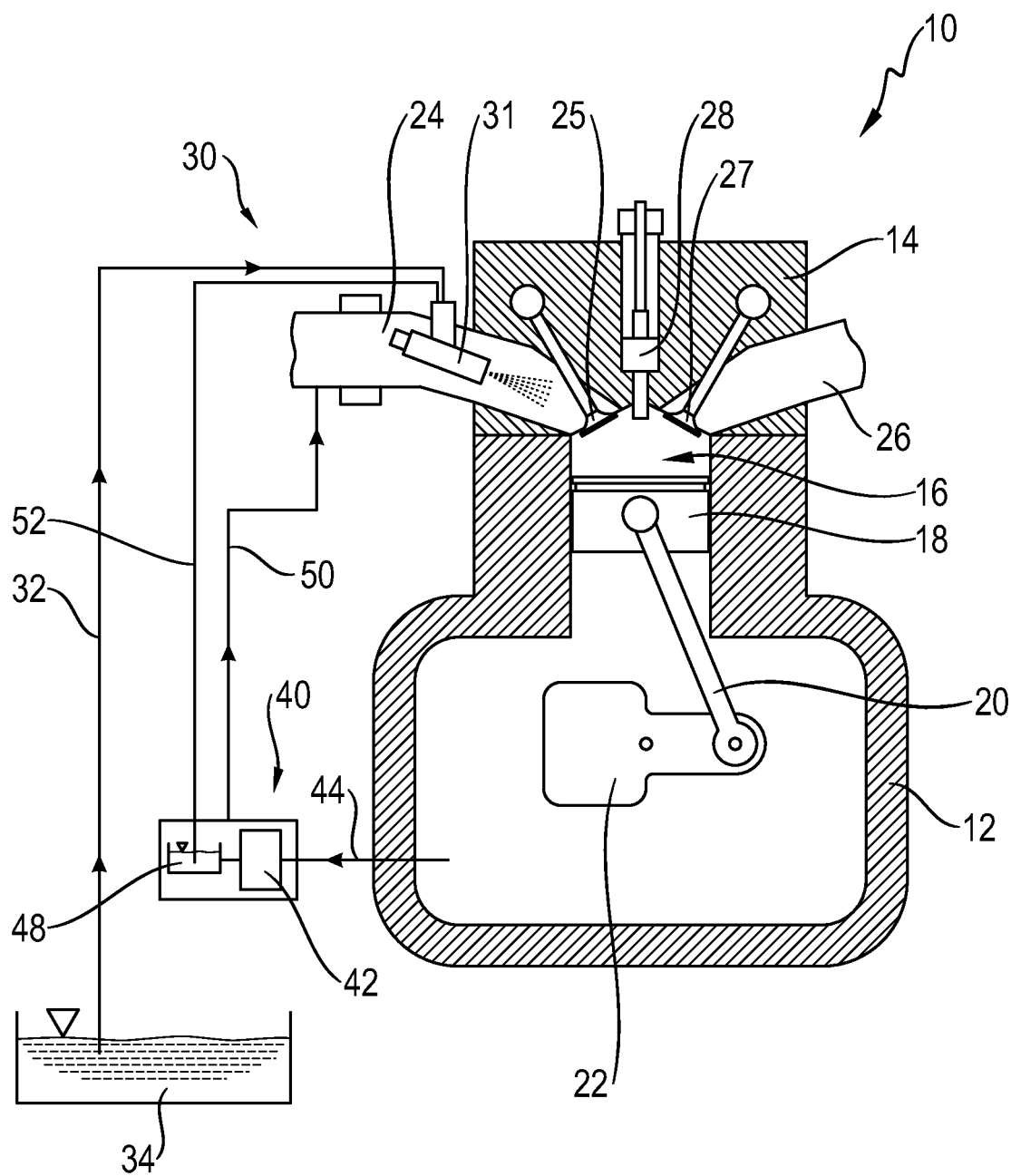

FIG. 1 shows diagrammatically an internal combustion engine with a crankcase ventilation device according to a first exemplary embodiment, and FIG. 2 shows diagrammatically an internal combustion engine with a crankcase ventilation device according to a second exemplary embodiment.

DETAILED DESCRIPTION OF THE INVENTION

FIG. 1 discloses an internal combustion engine 10 of a motor vehicle. The internal combustion engine 10 has a crankcase 12, a cylinder head 14 and several cylinders 16, wherein the figures show only one cylinder 16. A piston 18, which moves in oscillation during operation of the internal combustion engine 10, is arranged in the cylinder 16. The piston 18 is connected to a connecting rod 20, wherein a first end of the connecting rod is rotatably attached to the piston 18 and a second end is rotatably and eccentrically connected to a crankshaft 22. During operation of the internal combustion engine 10, the piston 18 moves in oscillation between a bottom dead center and a top dead center.

Above the top dead center, the cylinder 16 has an inlet 23 which is fluidically connected to an air intake tract 24. The inlet 23 can be closed by an inlet valve 25, wherein the inlet valve 25 opens and closes the inlet 23 as required. Also above the top dead center and adjacent to the inlet 23, the cylinder 16 has an outlet 29 which is fluidically connected to an exhaust gas tract 26. The outlet 29 is closed and opened by means of an outlet valve 27. A fuel injector 28 is arranged between the inlet 23 and the outlet 29.

During operation of the internal combustion engine 10, air is drawn in via the inlet 23 and air intake tract 24, and fuel is injected into the cylinder 16 via the fuel injector 28. After combustion of the air-fuel mixture, the exhaust gas is expelled from the cylinder 16 via the outlet 29 and exhaust gas tract 26.

To save fuel, increase the power of the internal combustion engine and/or reduce the emissions from the internal combustion engine, the internal combustion engine 10 has a water injection device 30. The water injection device 30 has a water injector 31 and a water tank 34. The water injector 31 is arranged in the intake tract 24 and is fluidically connected to the water tank 34 by a water line 32. By such an arrangement of the water injector 31, water is injected into the intake tract 24 in the form of fine mist, wherein the injected water is carried with the air stream present in the intake tract 24 and the water is thereby conveyed into the cylinder 16.

During operation of the internal combustion engine 10 and during the oscillating motion of the piston 18, a so-called blow-by mixture flows out of the cylinder 16 via a movement gap 19, formed between a piston ring (not shown in the FIG) and a cylinder wall 17, into the crankcase 12. To prevent the pressure in the crankcase 12 from rising unacceptably, the crankcase 12 is fluidically connected via a gas line 44 to a crankcase ventilation device 40, through which the blow-by mixtures flowing into the crankcase 12 can escape.

Because of the water injection in the cylinder 16, the injected water is also contained in the blow-by mixture. The water introduced into the intake tract 24 and hence into the cylinder 16 mixes in the cylinder 16 with the remaining components, in particular the fuel, lubricating oil and residual hot exhaust gas remaining in the cylinder 16, wherein the water is contained in the blow-by mixture in the form of water vapor. Thus water together with the other components flows into the crankcase 12, in that the water is still present in the form of water vapor. Starting from the crankcase 12, the water together with the other components flows out of the crankcase 12 via the crankcase ventilation device 40.

According to aspects of the invention, an activated charcoal filter 42 is provided in the crankcase ventilation device 40. The blow-by mixture containing the injection water flows through the activated charcoal filter 42, wherein the hydrocarbons contained in the blow-by mixture are filtered out in the activated charcoal filter 42 since the hydrocarbons adhere to the activated charcoal of the activated charcoal filter 42. Following or during this process, the blow-by mixture cools such that the water condenses and separates from the gaseous constituents of the blow-by mixture, wherein after flowing through the activated charcoal filter 42, the water no longer contains hydrocarbons. The crankcase ventilation device 40 is fluidically connected to the water tank 34 so that the water, cleaned of the hydrocarbons, flows back into the water tank 34 and can be reused for water injection. Alternatively, the water can flow from the crankcase ventilation device 40 into the environment, since the environmentally harmful hydrocarbons are no longer dissolved in the water.

The crankcase ventilation device 40 is also fluidically connected to the intake tract 24 via a line 50, wherein the gaseous constituents of the blow-by mixture are conducted into the intake tract 24 via the line 50, starting from the activated charcoal filter 42.

FIG. 2 shows a second embodiment of the internal combustion engine 10, wherein the only difference from the first embodiment (shown in FIG. 1) is that the activated charcoal filter 42 has an intermediate water storage 48 in which the cleaned water is collected. The intermediate water storage 48 is fluidically connected via a line 52 directly to the water injector 31 of the water injection device 30, so that the cleaned water can be used directly for water injection.

Thus an internal combustion engine 10 with water injection 30 is created, wherein the water flowing with the blow-by mixture into the crankcase 12 and into the crankcase ventilation device 40 is cleaned of hydrocarbons in a simple and economic fashion by the provision of an activated charcoal filter 42 in the crankcase ventilation device 40, and thereby the water may be discharged to atmosphere in an environmentally friendly fashion or may be reused in the water injection system 30.

Structural embodiments other than the embodiments described are also possible which fall within the scope of protection of the main claim. For example, the cylinder 16 or the water injection device 30 may be configured differently.

What is claimed:

1. An internal combustion engine comprising:
a crankcase,
a cylinder head,
wherein the cylinder head and the crankcase delimit at least one cylinder in which a translationally moving piston is arranged,
a water injection device for injecting water into the at least one cylinder, and
a crankcase ventilation device which is fluidically connected to the crankcase,
wherein a blow-by mixture containing injection water can flow through the crankcase ventilation device,
wherein the crankcase ventilation device has an activated charcoal filter through which the blow-by mixture containing the injection water can flow,
wherein the water injection device has a water injector which is arranged in an intake tract that is configured to be fluidically connected to the cylinder,
wherein the crankcase ventilation device is fluidically connected to the intake tract such that the gases of the blow-by mixture are conducted into the intake tract,
wherein the crankcase ventilation device includes an inlet through which the blow-by mixture is delivered to the activated charcoal filter for filtering, a first outlet through which filtered gases of the blow-by mixture are delivered to the intake tract, and a second outlet through which filtered injection water is delivered to the water injection device.

2. The internal combustion engine as claimed in claim 1, wherein the water injection device has a water tank, wherein the crankcase ventilation device is fluidically connected to the water tank such that water, which has separated out of the blow-by mixture and passed through the activated charcoal filter, flows into the water tank.

3. The internal combustion engine as claimed in claim 1, wherein the activated charcoal filter has an intermediate water tank which is fluidically connected to a water injector of the water injection device.

4. The internal combustion engine as claimed in claim 1, wherein the water injection device is positioned upstream of an inlet valve associated with the intake tract.

5. The internal combustion engine as claimed in claim 1, wherein the water injection device comprises two separate inlet ports.

6. The internal combustion engine as claimed in claim 5, wherein the water injection device comprises two separate water tanks, and wherein each water tank includes a separate water line leading to one of the two separate inlet ports of the water injection device, wherein the activated charcoal filter is fluidly connected to one of the two separate water tanks for delivering the filtered injection water into said one of the two separate water tanks.

7. The internal combustion engine as claimed in claim 6, wherein said one of the two separate water tanks is positioned downstream of the activated charcoal filter and upstream of the water injection device.

8. The internal combustion engine as claimed in claim 1, wherein the filtered injection water is delivered to a water tank and then to the water injection device.

9. The internal combustion engine as claimed in claim 1, further comprising a fluid line directly and fluidically connecting the first outlet to the intake tract through which the filtered gases of the blow-by mixture are delivered to the intake tract.

* * * * *